US011763231B2

(12) United States Patent
Lv et al.

(10) Patent No.: US 11,763,231 B2
(45) Date of Patent: Sep. 19, 2023

(54) WORKFLOW SERVICE APPLICATION STATING

(71) Applicant: VMware, Inc., Palo Alto, CA (US)

(72) Inventors: Lin Lv, Beijing (CN); Chaoting Xuan, Atlanta, GA (US); Xinda Yan, Beijing (CN); Qimin Yao, Atlanta, GA (US); Yunxia Cheng, Beijing (CN); Qian Liu, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 708 days.

(21) Appl. No.: 16/958,530

(22) PCT Filed: May 27, 2020

(86) PCT No.: PCT/CN2020/092647
§ 371 (c)(1),
(2) Date: Jun. 26, 2020

(65) Prior Publication Data
US 2023/0196239 A1   Jun. 22, 2023

(51) Int. Cl.
*G06Q 10/0633* (2023.01)
(52) U.S. Cl.
CPC .............................. *G06Q 10/0633* (2013.01)
(58) Field of Classification Search
CPC .......................................... G06Q 10/00–50/00
USPC ............................................... 705/7.11–7.42
See application file for complete search history.

(56) References Cited

U.S. PATENT DOCUMENTS

| | | | | |
|---|---|---|---|---|
| 9,996,331 B1* | 6/2018 | Chen | ..................... | H04L 41/122 |
| 10,284,532 B2* | 5/2019 | Quinlan | .............. | H04L 63/0807 |
| 10,592,082 B2* | 3/2020 | Twist | ................... | G06Q 10/103 |
| 11,030,077 B1* | 6/2021 | Kwan | ................ | G06F 11/3692 |
| 2003/0028390 A1* | 2/2003 | Stern | ...................... | G06Q 30/06 |
| | | | | 705/1.1 |
| 2010/0058290 A1* | 3/2010 | Williamson | .............. | G06F 8/20 |
| | | | | 717/106 |
| 2012/0254825 A1* | 10/2012 | Sharma | ..................... | G06F 8/34 |
| | | | | 717/101 |
| 2015/0135160 A1* | 5/2015 | Gauvin | ..................... | G06F 8/30 |
| | | | | 717/109 |
| 2018/0157472 A1* | 6/2018 | Chen | .................. | H04L 41/0806 |
| 2019/0317941 A1* | 10/2019 | Razallian | .............. | G06F 16/148 |
| 2021/0019707 A1* | 1/2021 | Sathiamoorthy | ..... | H04L 51/046 |

\* cited by examiner

*Primary Examiner* — Alan S Miller
(74) *Attorney, Agent, or Firm* — Thomas Horstemeyer, LLP

(57) ABSTRACT

Disclosed are various approaches for workflow service application stating. In some aspects, an application content request is transmitted to a workflow service. The application content request can request updated states from a network service that acts as a back end for the application. The application content can be provided to the client device or other installed applications, without having opened the application on a client device.

20 Claims, 9 Drawing Sheets

WORKFLOW SERVICE APPLICATION STATING

CROSS-REFERENCE TO RELATED APPLICATIONS

The present application claims priority to and the benefit of the following and is a national stage entry pursuant to 35 U.S.C. of International Patent Application No. PCT/CN2020/092647, filed on May 27, 2020 and entitled "WORKFLOW SERVICE APPLICATION STATING, SEARCHING, AND NETWORKING," the entire contents of which is hereby incorporated herein by reference in its entirety.

BACKGROUND

In an enterprise setting, individuals can utilize a number of different applications in order to complete tasks for an enterprise. These individuals can use authentication credentials to login to various applications or various services. Often times, these authentication credentials differ from service to service, even though they represent the same individual or group. For example, a user can rely on a cryptographic certificate to access one service, a username and password to access a second service, and a group or enterprise-wide credential to authenticate with a third service. In some cases, the enterprise can mandate that a particular service be used for a particular type of task.

However, existing applications that access the network services cannot provide notification and searching of states and content without first being opened. In addition, existing applications that access network services, as well as those executed in isolated containers, can struggle to share application content. Accordingly, traditional methods can be ineffective for accessing network services in an enterprise setting.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to workflow service application integration. For example, stating, notification, querying, and networking of applications that access network services. The applications can be accessed through a workflow application or a workflow service that coordinates authentication with network services as a back end for application functionality. Existing applications cannot provide notification and searching of states and content without first being opened. In addition, existing applications that access network services, as well as those executed in isolated containers, can struggle to share application content. Accordingly, traditional methods can be ineffective for accessing network services in an enterprise setting. However, the present disclosure describes more effective mechanisms for workflow service application integration.

Figure 1:
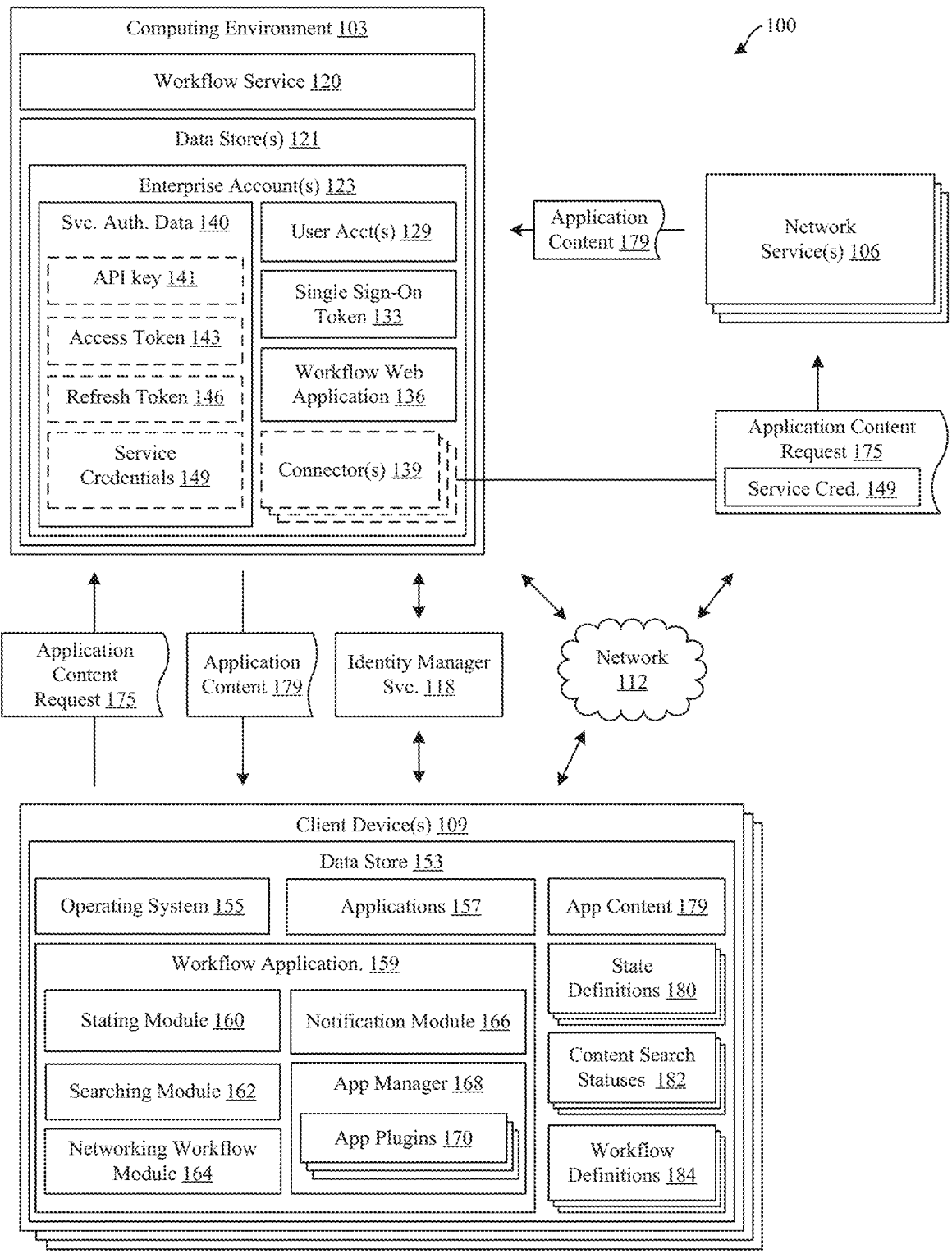
FIG. 1 is a drawing of an example of a networked environment, including client devices, network services, an identity manager service, a workflow service, and other components in communication through a network.

With reference to FIG. 1, shown is an example of a networked environment 100. The networked environment 100 can include a computing environment 103 executing a workflow service 120, network services 106, and client devices 109 in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 executing the workflow service 120 can include a server computer or any other system providing computing capability. While referred to in the singular, the computing environment 103 can include a plurality of computing devices that are arranged in one or more server banks, computer banks, or other arrangements. The computing devices of the computing environment 103 can be located in a single installation or can be distributed among many different geographical locations local and/or remote from the other components. The computing environment 103 can include a grid computing resource or any other distributed computing arrangement. The computing environment 103 can also include or be operated as one or more virtualized computer instances. For purposes of convenience, the computing environment 103 is referred to herein in the singular. The components executed on the computing environment 103 can include a workflow service 120 as well as other applications, services, processes, systems, engines, or functionality not discussed in detail herein. The workflow service 120 can be stored in the data store 121 of the computing environment 103.

The workflow service 120 can be utilized by one or more enterprises. In some embodiments, the workflow service can be part of a local network, trusted network, or intranet, which can be separate from the other components of the networked environment 103. In some cases, the identity manager service 118 can be part of the computing environment 103. In other cases, the identity manager service 118 can be separate from the computing environment 103.

The workflow service 120 can manage enterprise workflows performed by users of the client devices 109. The workflow service 120 can also manage authentication with network services 106 that are utilized as backend services for the workflows. The workflow service 120 can monitor one or more network services 106 that a user is authorized to access. For example, the workflow service 120 can query a network service 106 for application content 179 using an authenticated application content request 175 that includes service credentials 149. In some cases, the workflow service 120 can receive an application content request 175 from the workflow application 159, append service credentials 149, and relay the request to the network service 106 to identify new application content 179. The application content request 175 can include a for application state request, a user-initiated search request, a networking workflow or action request. The application content 179 can include data received from the network services 106 in response to the request. The application content 179 can include application states, search or query results, workflow action results, and other content that is typically accessed by opening or accessing an application 157. The application content 179 can include text, images, files, and other content that is normally accessed by opening the application 157, on the client device 109, to show a user interface of the application 157 that includes the application content 179.

In the various embodiments, the workflow application 159 or the workflow service 120 can drive the processes described herein. The components, data, and functionalities described with respect to the workflow application 159 can also be provided as a workflow web application 136, of the workflow service 120 that is accessed through the client device 109. To this end the modules of the workflow application 159, as well as the application content 179, state definitions 180, content search statuses 182, and workflow definitions 184 can also be stored in the data store 121.

The applications 157 can include local applications installed on the client device, web applications hosted or provided by the network services 106, virtual desktops or virtual applications hosted or provided by the workflow service 120, and others. In some cases, the applications 157 can be containerized applications installed in isolated containers of the workflow application 159. The applications 157 can be accessed through a user interface of the workflow application 159. To this end, the workflow application 159 can include a user interface with icons corresponding to the various applications 157. The applications 157 can be launched, executed, or otherwise accessed by user-selection or manipulation of a corresponding icon.

The workflow service 120 can include authentication functionality, which can include retrieving, caching or storing service authentication data 140 provided by various network services 106. The service authentication data 140 can be used to query the network services 106 for information. In some embodiments, use of the workflow service 120 can be invisible to the user. In other embodiments, the user may be asked to opt-in to the use of authentication services of the workflow service 120 or the identity manager service 118 through a web-portal or other user interface. Such a web-portal or other user interface can be provided, for example, by the workflow service 120 or the identity manager service 118.

The data store 121 can include any storage device or medium that can contain, store, or maintain the instructions, logic, or applications described herein for use by or in connection with the computing environment 103. The data store 121 can be a hard drive, or disk of a host, server computer, or any other system providing storage capability. While referred to in the singular, the data store 121 can include a plurality of storage devices that are arranged in one or more hosts, server banks, computer banks, or other arrangements. The data store 121 can include any one of many physical media, such as magnetic, optical, or semiconductor media. More specific examples include solid-state drives or flash memory.

The data store 121 can include the memory of the computing environment 103, mass storage resources of the computing environment 103, or any other storage resources on which data can be stored by the computing environment 103. The data stored in the data store 121 can include, for example, a number of enterprise accounts 123, each of which can be associated with user accounts 129, service authentication data 140, single sign-on tokens 133, a workflow web application 136, and connectors 139.

The user accounts 129 can be associated with specific subsets of the service authentication data 140, single sign-on tokens 133, workflow web application 136, connectors 139, and application plugins 170, application state definitions 180, content search statuses 182, and workflow definitions 184. While the application plugins 170, application state definitions 180, content search statuses 182, and workflow definitions 184 can be stored on data store 153 of the client device 109, they can also be stored on the data store 121. The data stored in the data store 121 can be associated with the operation of the various applications and/or functional entities as described. A user account 129 includes information associated with a user. The information can include one or more authentication credentials, such as the single sign-on tokens 133, as well as stored or cached access tokens 143, refresh tokens 146, and service credentials 149. Other information about the user can also be stored as part of the user account 129, such as the user's name, email address, contact information, enterprise responsibilities, and client devices 109.

A user account 129 can also include access permissions that indicate computing resources that the user account is authorized to access. For example, the access permissions can indicate that a user account is permitted to access some network services 106 but is prohibited from accessing other network services 106. As another example, the access permissions can indicate that the user account 129 is allowed to access certain features of a network service 106, but is prohibited from accessing other features. For example, if one of the network services 106 that a user was permitted to access was a customer relationship management (CRM) service, the user might have permission to access his or her own contacts but be prohibited from accessing the sales contacts of other users.

The user account 129 can identify device data for associated client devices 109. Device data can include one or more of a device identifier, a unique device identifier (UDID), a media access control (MAC) address, an internet protocol (IP) address, or another identifier that uniquely identifies a device with respect to other devices. The device data can include device specifications, and a type of each client device 109. Specifications for the client device 109 can include a hardware configuration that specifies a chipset identifier, a video card identifier, a memory identifier, a monitor or screen identifier, an input device identifier, and a peripheral identifier for each peripheral utilized by the client device 109. Specifications for the client device 109 can include a software configuration that specifies an application identifier for each application installed on the client device 109, a driver or driver version for the hardware device and peripheral of the client device 109, an operating system or operating system version installed on the client device 109, and other information. The user account 129 can also include an organizational group of the user account 129 or the client device 109.

The single sign-on (SSO) token 133 can be a software token generated by the identity manager service 118 in response to a successful authentication of the user with the identity manager service 118 using authentication credentials for the identity manager. Other SSO credentials can also be generated. The identity manager credentials can be user-specific. The identity manager credentials represent the credentials that a user can present to the identity manager service 118 to authenticate the user's identity. Identity manager credentials can include a combination of a username and password, a cryptographic certificate, a one-time password, or a combination of several credentials as part of a multi-factor authentication schema. Examples of one-time passwords can include a one-time password generated using a version of the time-based one-time password algorithm (TOTP), or a one-time password generated using the HMAC-based one-time password (HOTP) algorithm.

The SSO token 133 can be used to provide the client device 109 access to various network services 106 on behalf of the authenticated user. The SSO token 133 can include a character string or other data. In some cases, the SSO token 133 can be provided in a request, a command, a response, a URL, a file, or another structure, and can be in XML format, JSON format, or another format. In some instances, such as those implementing a version of the KERBEROS protocol, a separate SSO token 133 can be generated for each network service 106 that the client device 109 attempts to access on behalf of the user. In other instances, the single SSO token 133 can be generated and used to provide the client device 109 with access to several of the network services 106. Although each of the network services 106 can have a different set of authentication credentials linked to the user account 129, such as a different user name and password combination, the SSO token 133 allows the user to authenticate once with the identity manager service 118 in order to use each of the network services 106 instead of having to authenticate with each of the network services 106 separately.

The identity manager service 118 can authenticate users and manage user authorizations or permissions to access network services 106, applications, data, or other computing resources. For example, the identity manager service 118 could correspond to a single sign-on portal that verifies a user's authentication credentials, issues SSO token 133 that identifies the user, and verifies whether the user has the appropriate access permissions to access one or more network services 106. Examples of identity managers 118 include AMAZON's AWS Identity and Access Management (IAM) service, VMWARE's Identity Manager, or MICROSOFT's Active Directory Federation Services.

A network service 106 can include a web application, a web service, or other network facing applications. The network services 106 can be utilized as a back end for applications 157 accessed or installed on a client device 109. For example, an email application 157 can send, receive, edit, and otherwise access emails that are hosted by the network service 106; a messaging application 157 can send, receive, edit, and otherwise access messages that are hosted or relayed through the network service 106; a file access application 157 can send, receive, edit, and otherwise access files that are hosted by the network service 106. The network service 106 can be federated or associated with a shared identity manager service 118 so each can be accessed using the identity manager service 118. One or more network services 106 can be provided by the same provider or by different providers. The network service 106 can receive application content request 175, and provide a service return including application content 179 based on the application content request 175. The workflow service 120 can generate the application content request 175, or receive an application content request 175 from a client device 109. The workflow service 120 can use a connector 139 to provide the application content request 175 to the network service 106.

The service authentication data 140 can include information that guides authentication with network services 106. For example, API keys 141, access tokens 143, refresh tokens 146, service credentials 149, cryptographic certificates and other credentials. The service authentication data 140 can also include network endpoints or addresses associated with particular functionalities provided by a network service 106. Service authentication data 140 can also include a process or a number of navigation actions or other actions that are required for the workflow service 120 to perform authentication with a network service 106 on behalf of a user.

The API key 141 can be a token provided by one of the network services 106 in response to a successful authentication with the network service 106. The API key 141 represents that a user account 129 is currently authorized to access or otherwise interact with the network service 106. The API key 141 can include a character string, code, or other data. The API key 141 can be provided to a network service 106 for authentication. For example, the API key 141 can be provided in an HTTP header, a URL query string parameter, a request body field, or another structure.

The access token 143 can be a token provided by one of the network services 106 in response to a successful authentication with the network service 106. The access token 143 represents that a user account 129 is currently authorized to access or otherwise interact with the network service 106. The access token 143 can include a character string, code, or other data. The access token 143 can be provided to a network service 106 for authentication. The access token 143 can be provided to a network service 106 for authentication. For example, the access token 143 can be provided in an HTTP header, a URL query string parameter, a request body field, or another structure. For security purposes, the access token 143 can have a time-limit associated with it, such as 1 hour, 3 hours, 6 hours, 8 hours, or some other period of time. Once the time-limit has expired, the access token 143 can no longer be used to prove current authentication status of the user account 129 with the network service 106. The access token 143 can be provided, for example, as part of an authentication exchange using a version of the OAUTH protocol.

The refresh token 146 can be a token provided by one of the network services 106 in response to a successful authentication with the network service 106. The refresh token 146 can be used to acquire a new access token 143 once a current or previous access token 143 expires. The refresh token 146 often has a much longer time-limit associated with it, such as 1 day, 1 week, 30 days, 3 months, or 1 year, which allows for the refresh token 146 to be used to acquire a series of access tokens 143 after an initial successful authentication. In the event that a user's access is revoked, the refresh token 146 can be marked invalid, preventing the refresh token 146 from being used to acquire new access tokens 143. The refresh token 146 can be provided, for example, as part of an authentication exchange using a version of the OAUTH protocol.

The workflow service 120 can submit an authentication request to the network service 106. Once authenticated, the network service 106 can provide credentials and other service authentication data 140 to the workflow service 120. The workflow service 120 can store or cache the service authentication data 140 to use on behalf of a user. If the service authentication data 140 expires, or the workflow service 120 determines that an authentication using the service authentication data 140 is unsuccessful, the workflow service 120 can attempt to obtain new credentials or new service authentication data 140. For example, the workflow service 120 can automatically obtain a new access token 143 for the user when the current access token 143 expires or is about to expire. For example, the workflow service 120 can determine that the access token 143 was obtained 59 minutes ago, but is only valid for one hour. As another example, the workflow service 120 can determine that the access token 143 was obtained 61 minutes ago, but the access token 143 was only valid for one hour. In response to either example, the workflow service 120 can submit a second authentication request to the network service 106. The second authentication request can include the refresh token 146.

The service credentials 149 can include a password, a token, a certificate, or another form of credentials. The service credentials 149 can be generated according to a security standard. The service credentials can be associated with a particular network service 106, or a particular function provided by the network service 106. Service credentials 149 can be considered a multi-user password, as multiple users or user accounts 129 can utilize the same service credentials 149 to access the network service 106. The service credentials 149 can also be group-wide credentials for use by a group of users, or enterprise-wide credentials for use by an entire enterprise. Group credentials, enterprise-wide credentials, or other multi-user credentials can also include a username and password, a cryptographic certificate, a character string, a one-time password, or a combination of several credentials as part of a multi-factor authentication scheme.

Connectors 139 can refer to services or components that can be configured to fetch information that enables a user to perform an action using a client device 109. In some cases, the connectors can be provided using a virtual machine or another virtual resource. Connectors 139 can include local connectors 139 hosted in the computing environment 103, or external connectors 139 hosted externally to the computing environment 103. Connectors 139 can handle communications with the network services 106. For example, a connector 139 can fetch user-specific and request-specific information from network services 106 according to the application content requests 175.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, a voice activated smart device, or any other device with like capability. The client device 109 can have an operating system that can perform functionalities and execute applications. The operating system 155 can be stored in a data store 153 that also includes applications 157, a workflow application 159, and other data. The client device 109 can execute the workflow application 159 to perform or access the functionality described for the workflow service 120. The client device 109 can be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine, a voice activated smart device, or a kiosk that is located in a particular location, or is not easily portable.

The operating system 155 of the client device 109 can execute various client functionalities or client applications 157, such as a browser application, a voice interaction functionality, or another application 157. The operating system 155 and some applications 157 can access network content served up by the computing environment 103, network services 106, or other servers and can present this information to a user through one or more user interface devices. For example, the client device 109 can render a user interface on a display, such as a liquid crystal display (LCD), organic light emitting diode (OLED) display, touch-screen display, or other type of display device. The client device 109 can also present audio information using an audio device and can provide haptic or physical feedback using a haptic device.

Some applications 157 can include a browser or a dedicated application, and a user interface can include a network page, an application screen, or other interface. The client device 109 can also access web applications using the browser application. Further, other applications 157 can include device management applications, enterprise applications, social networking applications, word processor applications, spreadsheet applications, media player applications, or other applications. The workflow application 159 can be an application that performs certain functions in concert with the workflow service 120. The workflow application 159 can perform actions as directed by the workflow service 120, for instance, by checking in with the workflow service 120, retrieving a command from the command queue, and implementing the command as discussed above.

The workflow application 159 can include a number of components or modules including a stating module 160, a searching module 162, a networking workflow module 164, a notification module 166, an application manager 168, and application plugins 170. The workflow application 159 and its components can operate in conjunction with the workflow service 120 to identify application content 179 for the various applications 157 without executing, opening, or launching applications 157 on the client device 109.

The stating module 160 can identify application content 179 including updated application states corresponding to state definitions 180. The searching module 162 can search within selected applications 157 indicated in the content search statuses 182, to identify application content 179 including content search results corresponding to search queries. The networking workflow module 164 can perform networking workflows to share and allow manipulation of application content 179 between different applications 157, according to workflow definitions 184.

The application manager 168 can refer to a module that is consumed or accessed by other modules. The application manager 168 can manage, for example, create, edit, and remove, various application plugins 170 that include one or more network actions that can be performed with respect to a particular application 157. The application plugins 170 can refer to an on-demand instruction set to perform the particular action to identify application content 179 from the network service 106 associated with the application 157. The application plugins 170 can be performed without a constant background presence or otherwise accessing the application 157 on the client device 109. A synchronization action corresponding to a state definition 180 can be included in an application plugin 170. A searching action can be included in an application plugin 170. One or more networking workflow actions can be included in an application plugin 170.

Through a user interface of the application manager 168, an administrator or user can define actions by providing an action name, API or other query URL, input parameters, input data, a method (e.g., GET, PUT, POST, DELETE), and other information. This information can be defined in the application plugin 170 for the application 157. The administrator can also test the action through the user interface. Once created and verified, the administrator can publish the application plugin 170, through the workflow service 120, to client devices 109. Actions can include getting new email, messages, or files; getting email, messages, or files flagged as important or urgent, getting email, messages, or files from a particular mail subfolder; sending email, messages, or files, and other actions. Actions can also include remote desktop actions such as getting a thumbnail view; launching with blast protocol; logon or logoff of current user; restarting desktop; getting or launching a collaboration session, and other actions. The end user can also create, test, and edit actions through the workflow application 159 and workflow web application 136.

The notification module 166 can provide notifications of the identified application content 179 in a user interface of the workflow application 159. For example, notification of new application states, search results, and completed networking workflows can be provided in a pop-up or overlay window provided in a bottom right corner, or any area of the workflow application 159 user interface. The identification of new application states, completed networking workflows, and completed searches can also be indicated using a notification badge overlaid on, or otherwise relative to an application icon corresponding to an application 157. The workflow application 159 can include an icon for the networking workflow module 164, and icons corresponding to individual workflow definitions 184. A notification badge on one or more of these icons can indicate that a workflow definition 184 has been triggered or completed.

Figure 2:
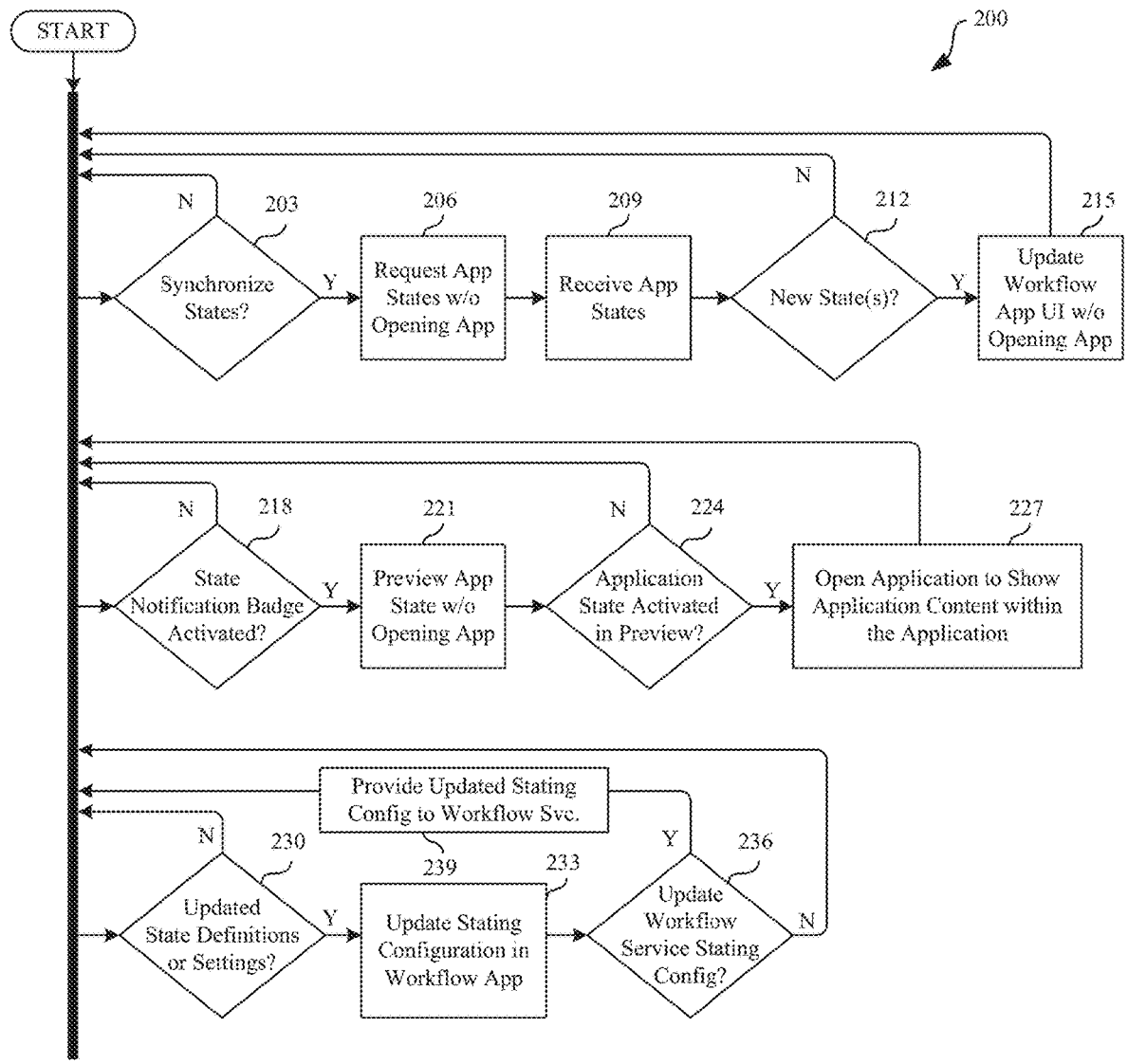
FIG. 2 is a flowchart outlining functionalities implemented by the workflow application and other components of the networked environment.

FIG. 2 shows an example flowchart 200 describing steps that can be performed by the components of the networked environment 100 of FIG. 1. Generally, the flowchart 200 describes how the workflow application 159 can notify a user with application states and other application content 179 without opening the applications 157. While the steps are described with respect to the workflow application 159 executed on a client device 109, the functionalities described can also include those performed by other components of the networked environment 100. The functionalities described can also correspond to a workflow web application 136 provided by the workflow service 120 and accessed by the client device 109. Although the flowchart 200 shows a specific order of execution, it is understood that the order of execution can be omitted, scrambled relative to the order shown, and executed concurrently or with partial concurrence.

In step 203, the workflow application 159 can determine whether to synchronize states. The workflow application 159 can direct a method or process to synchronize or identify application states corresponding to a state definition 180. The synchronization for the application 157 and individual application states can be toggled, for example enabled or disabled, as indicated by the state definition 180. If synchronization is enabled, the workflow application 159 can direct synchronization of the application state periodically or at a time specified in a synchronization schedule. If synchronization is enabled, and the time matches a time determined based on the synchronization schedule or synchronization period, then the workflow application 159 can move to step 206. The application states can be identified by the workflow application 159 without executing or accessing the application 157 on the client device 109.

In step 206, the workflow application 159 can request application states without accessing an application 157 on the client device 109. The workflow application 159 can transmit an application content request 175 for the application states to the workflow service 120. The application content request 175 can identify information to retrieve the application states and other application content 179 from a network service 106. For example, the application content request 175 can include an application plugin 170 from the client device 109, or identify an application plugin 170 stored in the data store 121. The application content request 175 can include SSO credentials associated with a user account 129, such as an SSO token 133.

The workflow service 120 can verify the SSO credentials in conjunction with the identity manager service 118, automatically identify service credentials 149 corresponding to the network service 106 identified in the application content request 175, append the service credentials 149 to the application content request 175, and forward it to a specified endpoint or URL of the network service 106.

In step 209, the workflow application 159 can receive application states. The workflow service 120 can receive application content 179 from the network service 106 and relay it to the workflow application 159 on the client device 109. The workflow application 159 can receive the application content 179, which can include application states corresponding to the state definition 180.

In step 212, the workflow application 159 can determine whether the application states correspond to new or updated application states. The workflow application 159 can compare known or existing application states to the application states retrieved based on the application content request 175.

If a retrieved application state differs from the known or existing application states, the workflow application 159 can move to step 215.

In step 215, the workflow application 159 can update the workflow application 159 user interface to provide or identify the application states without opening or accessing the application 157. For example, the new application state can be provided in a pop-up or overlay window provided in a bottom right corner, or any area of the workflow application 159. In addition, the new application state can be indicated using a state notification badge overlaid on or otherwise relative to an application icon corresponding to an application 157. A notification badge can indicate a number of new application states that are identified for a particular application or icon.

In step 218, the workflow application 159 can determine whether the state notification badge has been user-activated. The state notification badge can be activated by user interaction relative to the application icon that has the state notification badge. For example, state notification badge can be activated by a mouseover of the application icon, a user-selection of the state notification badge, or another user interaction. If a user has interacted with the state notification badge, the workflow application 159 can move to step 221.

In step 221, the workflow application 159 can generate a preview of the application state without opening the application 157. For example, in response to a mouseover event or another user interaction, the workflow application 159 can generate an overlay within the workflow application 159 user interface. The overlay can be generated relative to the cursor, relative to a location of the interaction such as click location, relative to the icon, or relative to the state notification badge. The overlay can include the application state and further application content 179. For example, the overlay can include a preview of file content, email content, message content, virtual desktop image or video, and other application content 179. The preview can be interactive, allowing a user to scroll or pan within the preview to show multiple application states within the preview area or overlay area.

In step 224, the workflow application 159 can determine whether the application state is user-activated from the preview. For example, while the preview can be interactive, the user can also select a particular application state from the preview. If the application state is selected, the workflow application 159 can move to step 227.

In step 227, the workflow application 159 can open the application 157 to show the application state and other application content 179 within the application 157. For example, the workflow application 159 can execute the application 157 or launch a web application corresponding to the application 157. The workflow application 159 can also cause the application 157 to show the selected application state and other application content 179 related to that selected application state.

In step 230, the workflow application 159 can determine whether a stating configuration has been updated. The stating configuration can include state definitions 180 and synchronization settings. The workflow application 159 can generate a user interface to create, edit, delete, and otherwise update state definitions 180. For example, a user can create a state definition 180 that provides a notification when an email, file, or message is received, or when a workflow definition 184 is triggered or completed. The workflow application 159 can also provide a toggling element or another user interface element in the user interface. A user can activate or select the user interface element to enable or disable synchronization for an application 157, and for individual state definitions 180. If state definitions 180 or synchronization settings have been updated, then the workflow application 159 can move to step 233.

In step 233, the workflow application 159 can update the stating configuration of the workflow application 159. In other words, the stating configuration of state definitions 180 and synchronization settings can be updated in the stating module 160, state definitions 180, or otherwise locally to the client device 109. This can allow the workflow application 159 on the client device 109 to drive the stating and notification processes.

In step 236, the workflow application 159 can determine whether to update a stating configuration of the workflow service 120. For example, while the workflow application 159 can drive the stating and notification processes, as described in further detail with respect to FIG. 5, the workflow service 120 can also drive the stating and notification processes. In this case, the workflow application 159 can transmit the stating configuration to the workflow service 120, which can identify application states and provide updates to the workflow application 159 or workflow web application 136 without being prompted with a request transmitted from the client device 109. If the stating process, such as update schedule or timing is handled by the workflow service 120, then the workflow application can move to step 239.

In step 239, the workflow application 159 can provide the updated stating configuration to the workflow service 120. In implementations where the functionalities of the workflow application 159 are provided using the workflow web application 136, the updated stating configuration can be detected through a user interface rendered on the client device 109. The workflow web application 136 can be considered a part of the workflow service 120, and can provide or transmit the updated stating configuration to the other components of the workflow service 120.

Figure 3:
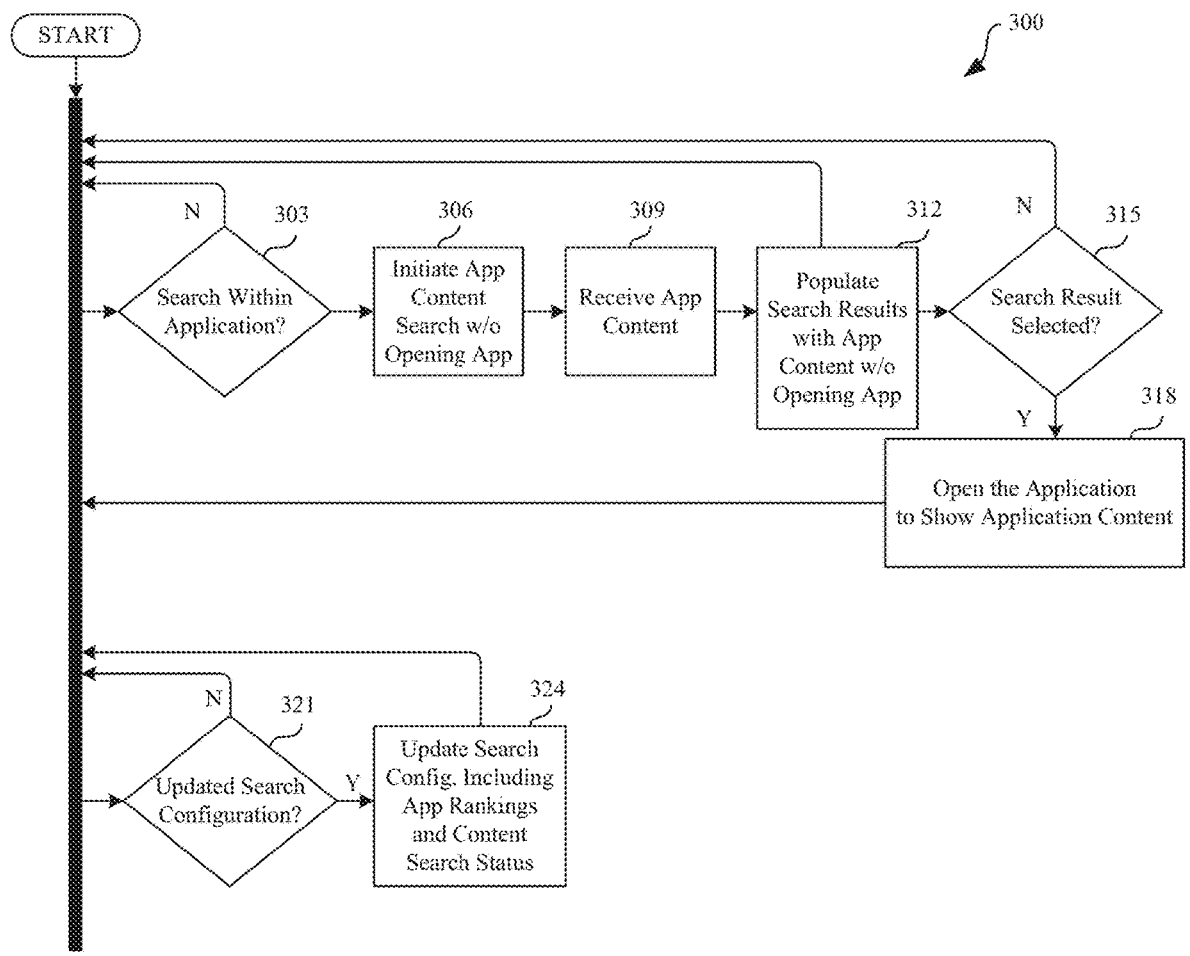
FIG. 3 is another flowchart outlining functionalities implemented by the workflow application and other components of the networked environment.

FIG. 3 shows an example flowchart 300 describing steps that can be performed by the components of the networked environment 100 of FIG. 1. Generally, the flowchart 300 describes how the workflow application 159 can search for application content 179 within applications 157 without opening the applications 157. While the steps are described with respect to the workflow application 159 executed on a client device 109, the functionalities described can also include those performed by other components of the networked environment 100. The functionalities described can also correspond to a workflow web application 136 provided by the workflow service 120 and accessed by the client device 109. Although the flowchart 300 shows a specific order of execution, it is understood that the order of execution can be omitted, scrambled relative to the order shown, and executed concurrently or with partial concurrence.

In step 303, the workflow application 159 can determine whether to search within an application 157. The workflow application 159 can provide a searching interface with the ability to search for application content 179 within an application 157 without opening the application 157. The searching interface can identify a search query or string that is entered by a user of the client device 109. The workflow application 159 can identify whether a content search status 182 indicates to search within a corresponding application 157, or whether to search only the content accessible in the data store 153, the client device 109, and the workflow application 159. The application content 179 can be referred to as content "within" the application 157 and can refer to content that is normally accessed by opening the application 157 on the client device 109 to show a user interface of the application 157 that includes the application content 179. If the content search status 182 indicates to search within the application 157, then the workflow application 159 can move to step 306.

In step 306, the workflow application 159 can initiate an application content search without opening the application 157. The workflow application 159 can transmit an application content request 175 to the workflow service 120 based on the user-entered search query. The application content request 175 can retrieve application content 179 from a network service 106 based on the user-entered search query. The application content request 175 can include an application plugin 170 from the client device 109, or identify an application plugin 170 stored in the data store 121. In order to authenticate the request, workflow application 159 can include SSO credentials along with the application content request 175.

The workflow service 120 can verify the SSO credentials in conjunction with the identity manager service 118, automatically identify service credentials 149 corresponding to a network service 106 associated with the application 157, append the service credentials 149 to the application content request 175, and forward it to a specified endpoint or URL of the network service 106

In step 309, the workflow application 159 can receive application content 179. The workflow service 120 can receive application content 179 from the network service 106, and relay it to the workflow application 159 on the client device 109. The workflow application 159 can receive the application content 179 corresponding to the user-entered search query.

In step 312, the workflow application 159 can populate search results with the application content 179 without opening the application 157. The workflow application 159 can generate a user interface that includes search results corresponding to the user-entered search query. The workflow application 159 can rank the search results based on a user-specified or predetermined application ranking. The workflow application 159 can rank the search results based on relevance, date, and other factors.

In step 315, the workflow application 159 can determine whether a search result is selected. The workflow application 159 can detect a user-selection of a search result from a listing of search results. If a search result is selected, the workflow application 159 can move to step 318.

In step 318, the workflow application 159 can open the application 157 to show the application content 179 within the application 157. For example, the workflow application 159 can execute the application 157 or launch a web application corresponding to the application 157. The workflow application 159 can also cause the application 157 to show the selected application state and other application content 179 related to that selected application state.

In step 321, the workflow application 159 can determine whether a search configuration has been updated. The search configuration can include application rankings and content search statuses 182. The workflow application 159 can generate a toggling element or another user interface element in the user interface. A user can activate or select the user interface element to enable or disable searching for application content 179 within the application 157.

The workflow application 159 can also generate a ranking element that increases or decreases a ranking of a particular application 157 with respect to other applications 157 in a listing of applications 157. In some cases, the listing includes all applications 157 available to a user account, all applications 157 available to an enterprise, all applications 157 that are installed on the client device or the workflow application 159, or all applications 157 for which an application icon is configured within the workflow application 159. If application rankings or content search statuses 182 have been updated, then the workflow application 159 can move to step 324.

In step 324, the workflow application 159 can update the search configuration in the workflow application 159. The search configuration can include application rankings and content search statuses 182. The workflow application 159 can additionally or alternatively update the search configuration in the workflow service 120.

In implementations where the functionalities of the workflow application 159 are provided using the workflow web application 136, the updated search configuration can be detected through a user interface rendered on the client device 109. The workflow web application 136 can be considered a part of the workflow service 120, and can provide or transmit the updated search configuration to the other components of the workflow service 120.

Figure 4:
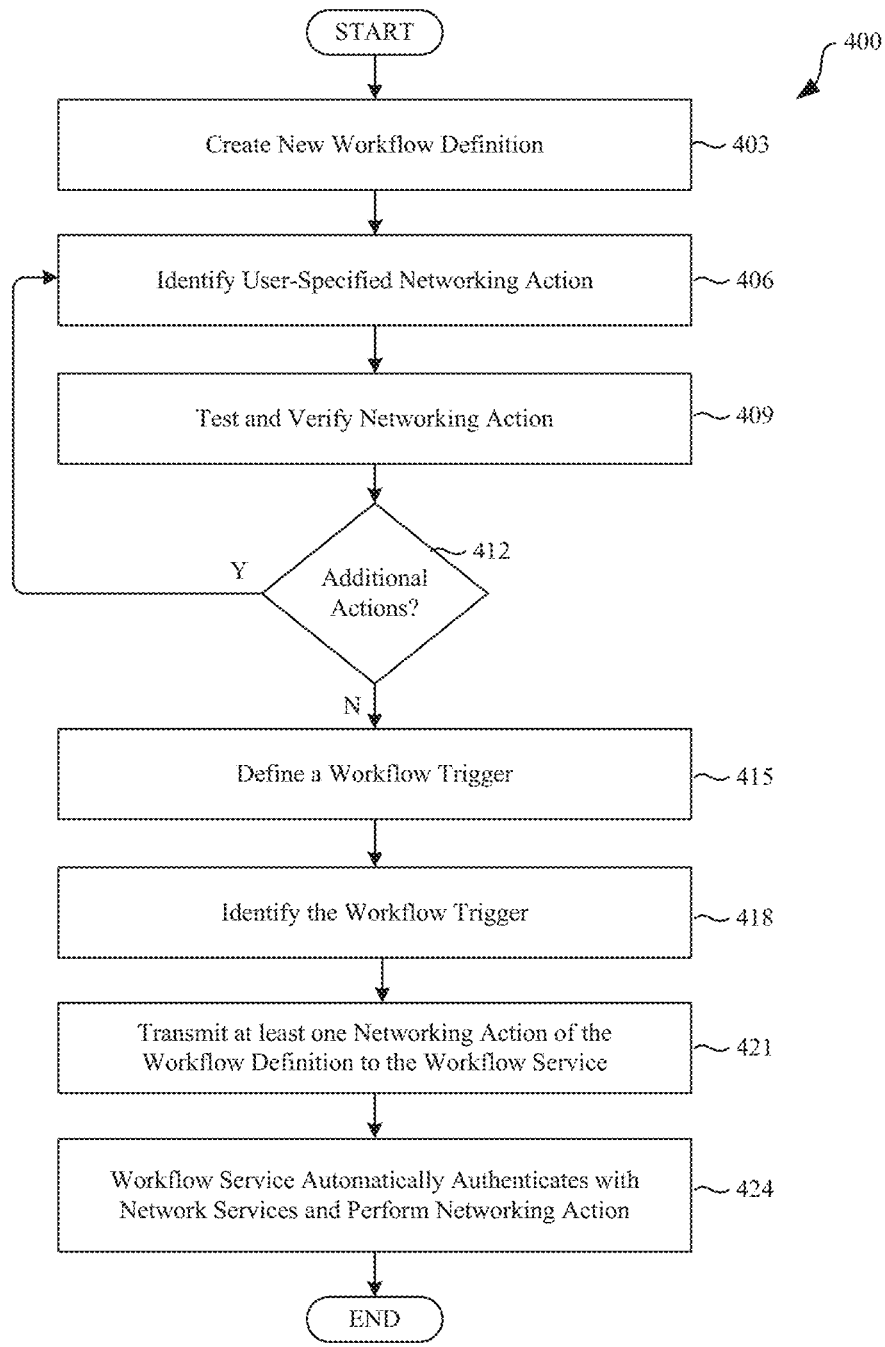
FIG. 4 is another flowchart outlining functionalities implemented by the workflow application and other components of the networked environment.

FIG. 4 shows an example flowchart 400 describing steps that can be performed by the components of the networked environment 100 of FIG. 1. Generally, the flowchart 400 describes how the workflow application 159 can generate and implement networking workflows between multiple isolated, containerized, or web applications 157, without opening the applications 157 on the client device 109. The applications 157 can utilize respective network services 106 as backends.

While the steps are described with respect to the workflow application 159 executed on a client device 109, the functionalities described can also include those performed by other components of the networked environment 100. The functionalities described can also correspond to a workflow web application 136 provided by the workflow service 120 and accessed by the client device 109. Although the flowchart 400 shows a specific order of execution, it is understood that the order of execution can be omitted, scrambled relative to the order shown, and executed concurrently or with partial concurrence.

In step 403, the workflow application 159 can create a new workflow definition 184. In existing technologies, isolated, containerized, and web applications 157 cannot communicate, network, or otherwise share data. However, the workflow application 159 can direct a process that enables a user to utilize predetermined and customized workflow definitions 184. The workflow definition 184 can include a file, set of files, or another structure that specifies a networking workflow of one or more networking actions.

In step 406, the workflow application 159 can identify a user-specified networking action. A networking action can refer to an action to share application content 179 between multiple applications that can include installed applications, isolated or containerized applications, and web applications that utilize respective network services 106. The workflow application 159 can generate a user interface element through which the user can select an action to perform against a network service 106 of a first application 157, using application content 179 from a second application 157.

For example, the networking action can specify to save application content 179 from an email application 157, such as an email attachment. The networking action can automatically save attachments to a particular folder or location of a file service application 157. The networking action can also specify to save only attachments from a particular address, with a particular naming convention, or with a particular file extension.

In step 409, the workflow application 159 can test and verify the networking action. The user interface of the workflow application 159 can include a user-selectable element to test the networking action. The workflow application 159 can verify the networking action by identifying whether a test networking action is successful. The workflow application 159 can determine whether the networking action was successful based on the responsiveness of an API of the network service 106. The workflow application 159 can also provide a test output of the networking action that is received from the network service 106.

In order to test the networking action, the workflow application 159 can transmit a test networking action request to the workflow service 120. The request can be authenticated based on SSO credentials such as an SSO token 133. The test networking action request can identify an API or other query URL of the network service 106, test parameters, test data, a method (e.g., GET, PUT, POST, DELETE), and other information. The test parameters and test data can be automatically generated by the workflow application 159 for testing purposes. The workflow service 120 can receive the test networking action request, automatically authenticate with the network service 106 using identified service credentials 149, and request the test action using the network service 106. A test output or test response can be received from the network service 106. If the network service 106 is responsive to the test networking action, the workflow application 159 can determine that the test networking action is successful.

In step 412, the workflow application 159 can identify whether there are any additional actions. If there are additional actions entered by a user, the workflow application 159 can proceed to step 406. Otherwise, if there are no additional actions, the workflow application 159 can complete and save the networking actions to the workflow definition 184 and proceed to step 415.

In step 415, the workflow application 159 can define a workflow trigger. The workflow trigger can be an action or event that can initiate performing the networking actions of the workflow definition 184. The workflow trigger can be defined at any point before or after the networking actions are defined. The workflow application 159 can generate a user interface element through which a user can specify a workflow trigger that initiates performing the networking actions of the workflow definition 184.

The workflow trigger can include a manual trigger, a timing-based trigger, or an event-based trigger. A manual trigger can include a trigger that is initiated by a user interaction with the workflow application 159. For example, a user can select a button, an icon, or another user interface element. The timing-based trigger can include a trigger that is based on a particular period of time having elapsed, a schedule, or another timing-based event. An event-based trigger can include receiving an email, file, or message; receiving an email, file, or message from a particular address or user; receiving an email or message that includes an attachment; receiving a notification of an application state; receiving a virtual desktop session invitation; and receiving a notification of the completion of another workflow definition 184.

In step 418, the workflow application 159 can identify the workflow trigger. For example, the workflow application 159 can determine that the event defined as the workflow trigger has occurred. As indicated above, the workflow trigger can include a manual trigger, a timing-based trigger, or an event-based trigger.

In step 421, the workflow application 159 can transmit at least one networking action of the workflow definition 184 to the workflow service 120. In some cases, the workflow application 159 can transmit the networking actions of the workflow definition 184 to the workflow service 120 individually, wait for confirmation or results to be returned, and then transmit the next networking action. The individual networking action requests can identify or include an application plugin 170 or connector 139 that facilitates performing the networking action against the network service. The networking action request can identify an API or other query URL of the network service 106, parameters, data, a method (e.g., GET, PUT, POST, DELETE), and other information. The networking action request can include an SSO credential such as the SSO token 133. The parameters and data included can correspond to application content 179 that was received or identified from a different network service 106.

In some examples, the workflow application 159 can transmit the workflow definition 184, so that the workflow service 120 completes the workflow based on a single request. This networking workflow request can include an SSO credential such as the SSO token 133. Where the workflow trigger is timing-based or event-based, this can also be performed prior to identification of the workflow trigger so that the workflow service 120 can identify the timing-based or event-based workflow trigger and automatically perform the networking actions of the workflow definition 184.

In step 424, the workflow service 120 can automatically authenticate with the network service 106 and perform the networking action. Where the networking action is received in a networking workflow request, the workflow service 120 can authenticate with the respective network services 106 corresponding to each networking action of the workflow definition 184 using the appropriate service credentials 149.

Figure 5:
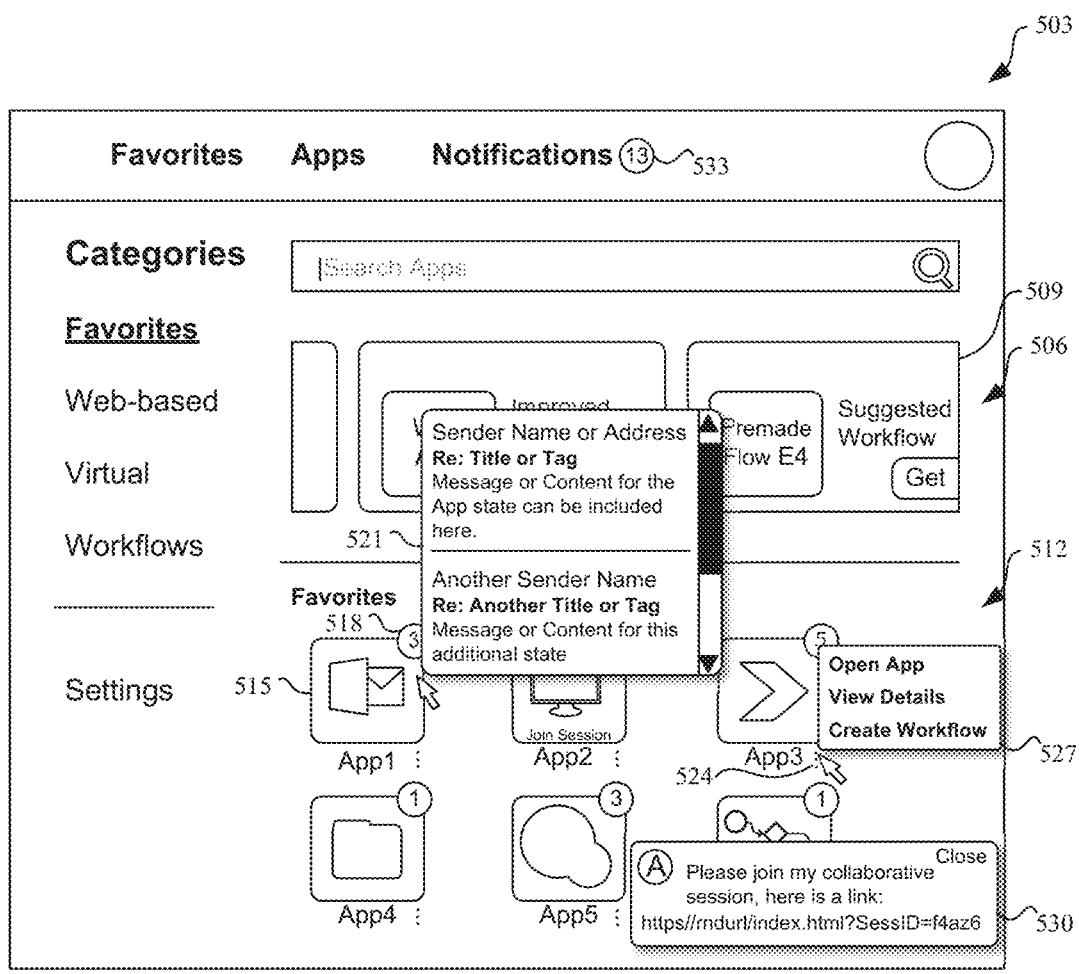
FIG. 5 is a drawing illustrating functionalities implemented by components of the networked environment and presented using a display of a client device.

FIG. 5 shows an example of a user interface 503 generated by the workflow application 159 and rendered for display on a client device 109 of FIG. 1. The user interface 503 illustrates examples of providing application stating for an application 157 on the client device 109 without opening the application 157. The user interface 503 can also be generated by the workflow web application 136 of the workflow service 120.

The user interface 503 can include a section or area 506 that includes a number of cards, panels, or user interface elements associated with actions identified for the user by the workflow service 120. For example, the user interface element 509 identifies a suggested workflow. The user can select "get" or otherwise interact with the user interface element 509 to install or configure a workflow according to a workflow definition 184.

The user interface 503 can also include a section or area 512 that includes a number of application icons. The application icons can correspond to "favorites" or another group of application icons that includes web-based applications, virtual applications, installed local applications, and workflows accessible through the workflow application 159. The workflows can correspond to workflow definitions 184 configured for the user or user account of the workflow application 159.

The user interface 503 can also include an application icon 515 corresponding to "App1," which can be an email application 157. The workflow application 159 can generate a state notification badge 518 for the application icon 515.

The state notification badge 518 can be overlaid on or otherwise can be provided relative to the application icon 515. The state notification badge 518 can include a number that indicates how many new or updated application states are identified for the application 157 corresponding to "App1."

The state notification badge 518 can be activated based on user interaction with the state notification badge 518 or the application icon 515. For example, a mouseover event such as placing the cursor over the application icon 515 can activate the workflow application 159 to generate an application content element 521 that provides application content 179 corresponding to new application states for the application 157 corresponding to "App1." Also, clicking on, long-press for a predetermined time, or otherwise interacting with the state notification badge 518 can also activate the workflow application 159 to generate the application content element 521. The state notification badge 518 and application content element 521 can be generated in the workflow application 159 without opening the application 157 corresponding to "App1" on the client device 109.

The application content element 521 can include a pop-up or overlay interface element. Since "App1" is an email application 157, the application content 179 provided in the application content element 521 can include a sender name or address, a title, and a message or other content for the app state. The application content element 521 can include the ability to scroll through multiple states or additional application content 179. Certain user interactions, such as clicking on a particular application state within the application content element 521 can cause the application 157 corresponding to "App1" to be opened on the client device 109 to show the selected application state.

The user interface 503 can also include, for each application icon, additional options that can be accessed by interacting with a user interface element 524 relative to an application icon. In response to a user-selection of the user interface element 524, an options element 527 can be generated showing additional actions that can be performed relative to an application 157. For example, the options element 527 can include a user interface element that opens the web application, virtual desktop application, or other applications 157. The options element 527 can include a user interface element that shows additional details for the application 157, such as the current workflow definitions 184 and application state definitions 180 that refer to the application 157, an application type of the application 157, its size on the client device 109, and other details. The options element 527 can include a user interface element that opens an interface to create a workflow definition 184 or a state definition 180 that includes the application 157.

The user interface 503 can also include an overlay or pop-up notification 530. The pop-up notification 530 can provide notification of new application states, search results, and completed networking workflows in a bottom right corner, or any area of the workflow application 159 user interface 503. In this case, the pop-up notification 530 can include an application state, such as a new collaborative session or another virtual desktop session. The pop-up notification 530 can also include a user-selectable link that automatically connects to the virtual desktop or collaborative session. The link can include a session identifier for the virtual desktop or collaborative session.

The user interface 503 can also include a notification badge 533 generated relative or adjacent to a notifications tab element. The notification badge 533 can indicate a total number of all new notifications of new application states, search results, and completed networking workflows. A user interaction with the notification badge 533 such as a mouseover, click, long press, or other event can cause application content 179 associated with the new application states, search results, and completed networking workflows to be provided as a pop-up or overlay user interface element. Application content from multiple applications can appear in this user interface element. A selection of the notification tab element can bring up a listing of the application content 179 associated with the new application states, search results, and completed networking work-flows to be provided in the body of the user interface rather than in a pop up or overlay.

Figure 6:
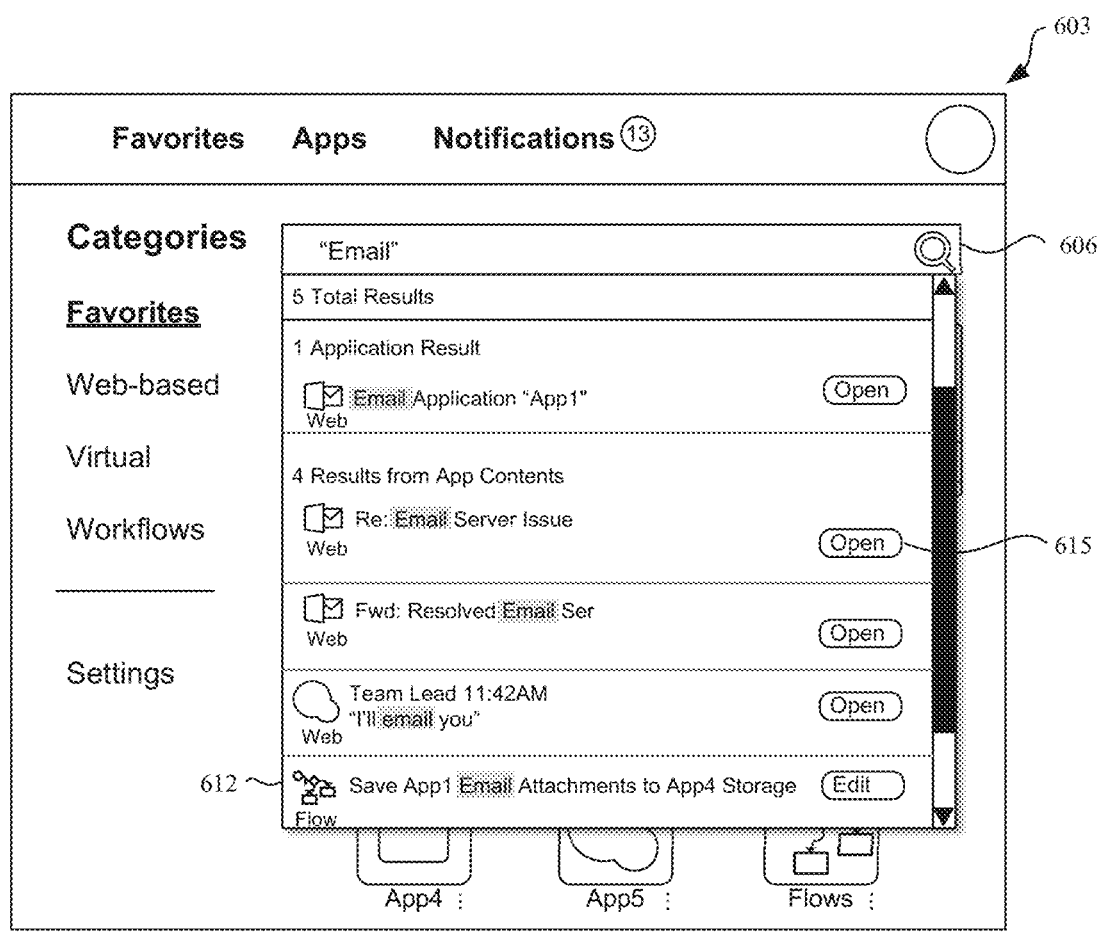
FIG. 6 is another drawing illustrating functionalities implemented by components of the networked environment and presented using a display of a client device.

FIG. 6 shows an example of a user interface 603 generated by the workflow application 159 and rendered for display on a client device 109 of FIG. 1. The user interface 603 illustrates examples of providing application searching for an application 157 on the client device 109 without opening the application 157. The user interface 603 can also be generated by the workflow web application 136 of the workflow service 120.

The user interface 603 can include a search element 606. A user can enter a search string or query into the search element 606. For example, the user can search for "Email." The user interface 603 can generate a search results element 612 that includes application content 179 without opening the applications 157. The search results element 612 can include a number of search results that correspond to applications 157 that are identified based on the search query. The search results element 612 can identify a number of search results that correspond to application content 179 normally accessed by opening an application 157. The search results element 612 can be generated without opening the application 157. The search results element 612 can also highlight the search query in each result, if applicable. A selection of a particular search result, or a user interface element 615 relative to the search result, can open the application 157 corresponding to that result. The workflow application 159 can open the application 157 to show the application content 179 within a user interface of the application 157.

Figure 7:
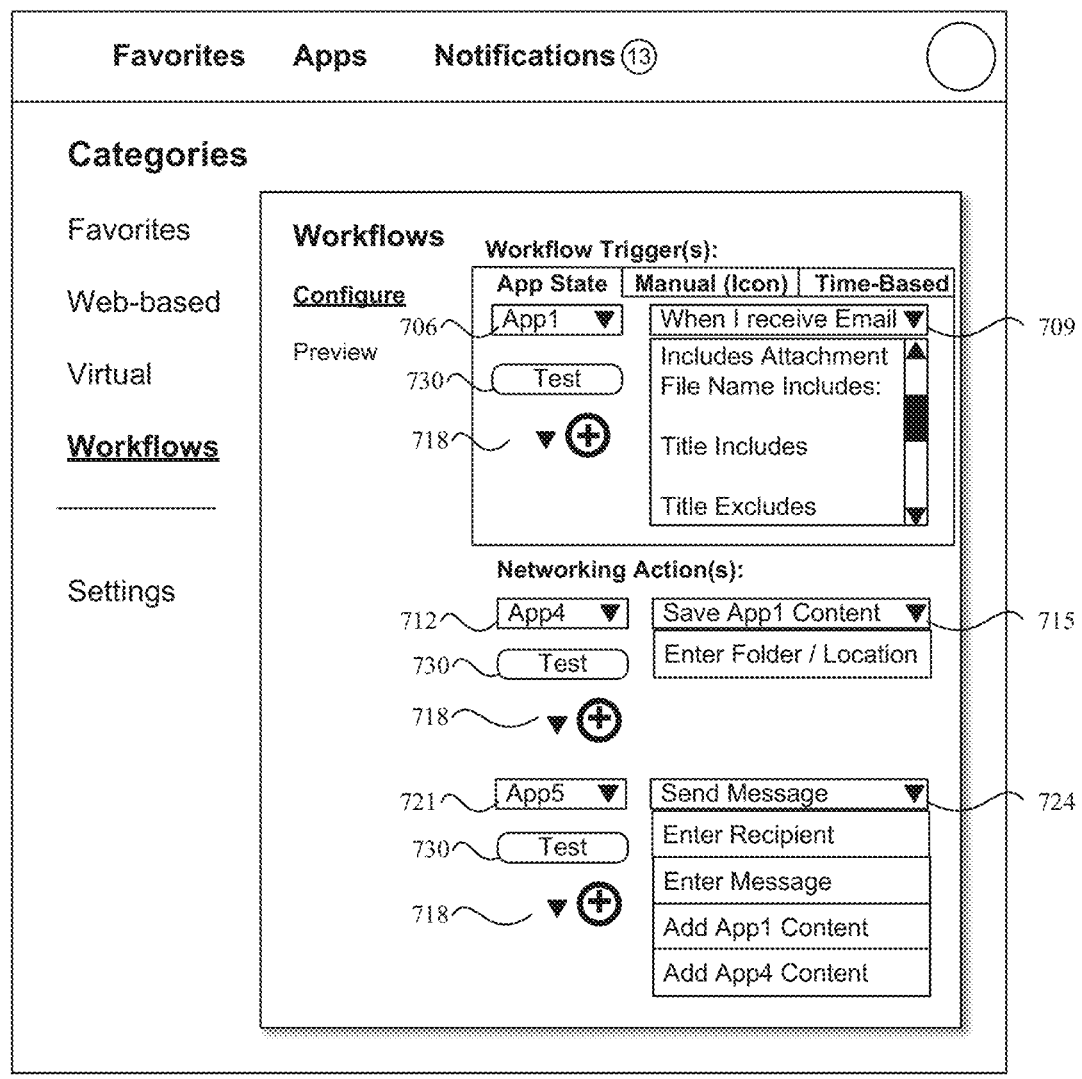
FIG. 7 is another drawing illustrating functionalities implemented by components of the networked environment and presented using a display of a client device.

FIG. 7 shows an example of a user interface 703 generated by the workflow application 159 and rendered for display on a client device 109 of FIG. 1. The user interface 703 illustrates examples of providing application networking of application content 179 between different applications 157, without opening the applications 157. The user interface 703 can also be generated by the workflow web application 136 of the workflow service 120.

The user interface 703 can enable a user to define a workflow definition 184 that includes workflow triggers and networking actions. The user can create workflow triggers including manual triggers, time-based triggers, and application state or event-based triggers. A user can define an application state-based workflow trigger by selecting an application using the user interface element 706, which can include a dropdown menu with a list of applications 157. Once an application 157 is selected, a user interface element 709 can be populated to include a dropdown menu with a list of application states or events that can be used individually or in combination to define a workflow trigger that involves the selected application 157. Where the application 157 is an email application 157, the trigger can include receiving an email that includes an attachment. Further parameters can include a particular string associated with the file name of the attachment, a string included in a title of the email message, or a string excluded from a title of the email message.

The user interface 703 can enable a user to define networking actions for the workflow definition 184. For example, a user interface element 712 can include a dropdown menu with a list of applications 157. Once an application 157 is selected, a user interface element 715 can be populated to include a dropdown menu with a list of networking actions that involve the selected application 157. The networking actions can be utilized individually or in combination to define a workflow. In some cases, the networking action can include user-selectable parameters to further specify how the networking action should be specifically carried out. For example, a networking action can include "Save App1 Content," such as saving application content 179 from an email application 157 using a file management application 157 "App4." A parameter can indicate a particular folder or location relative to the file management application 157 to place the application content 179 from the email application 157.

The workflow definition 184 can include multiple networking actions. A user interface element 718 can be selected to add an additional networking action to the workflow definition 184. Workflow application 159 can generate a user interface element 721 that includes a dropdown menu with a list of applications 157. Once an application 157 is selected, a user interface element 724 can be populated to include a dropdown menu with a list of networking actions and parameters that involve the selected application 157. Selected "App 5" can include a messaging application 157, and the networking action can include sending a message using the messaging application 157. The parameters can include specifying a recipient, a message, and application content 179 from another application 157. The user interface 703 can include a user-selectable elements 730 to tests the networking action and trigger.

Figure 8:
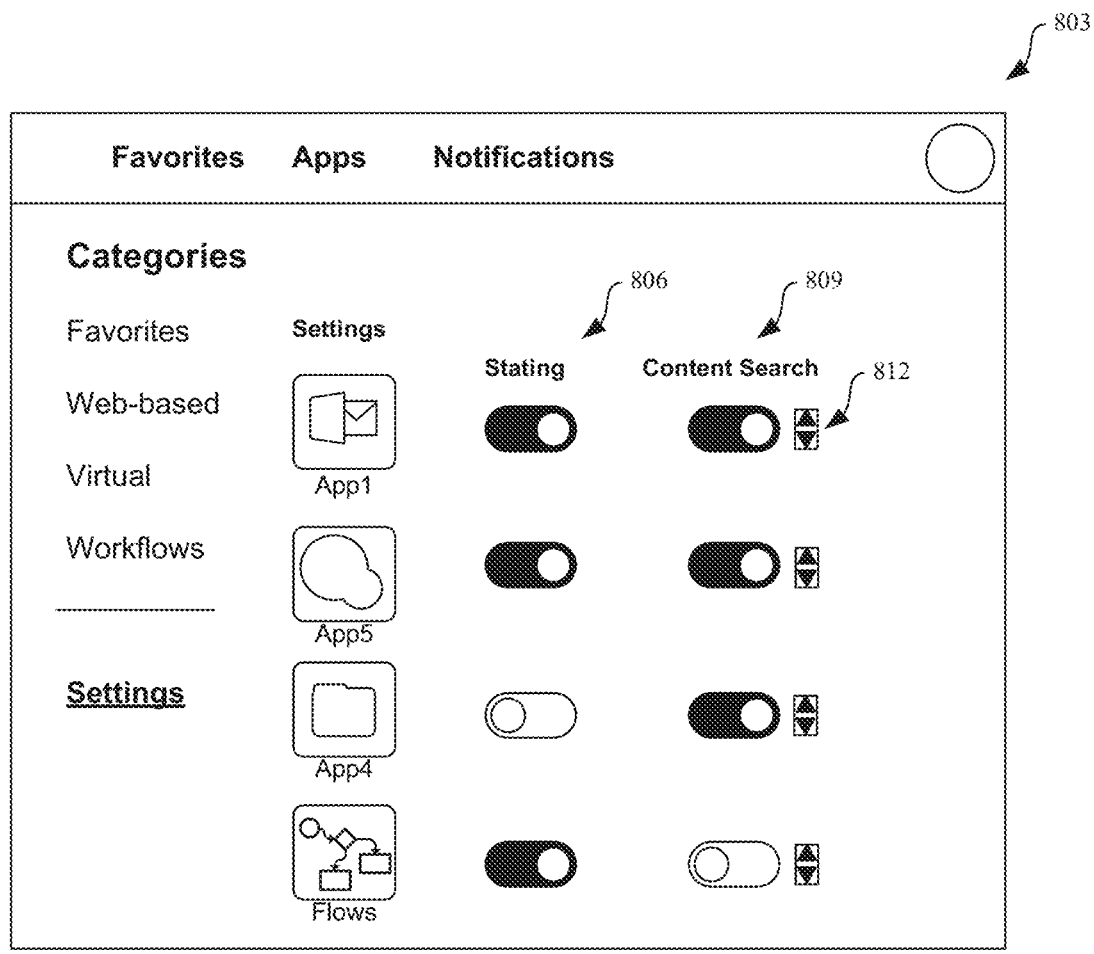
FIG. 8 is another drawing illustrating functionalities implemented by components of the networked environment and presented using a display of a client device.

FIG. 8 shows an example of a user interface 803 generated by the workflow application 159 and rendered for display on a client device 109 of FIG. 1. The user interface 803 illustrates examples of a configuration interface for application stating and searching. The user interface 803 can also be generated by the workflow web application 136 of the workflow service 120.

The user interface 803 can include a number of user interface elements 806 that can be toggled, for example to enable or disable application stating for an application 157. Similarly, other user interface elements can enable or disable application stating for a particular application state definition 180. A stating status, such as enabled or disabled, can be saved or indicated in the state definitions 180 for the application 157. The user interface 803 can also include a number of user interface elements 809 that can be toggled, for example to enable or disable application searching within an application 157. A content search status 182 can indicate whether searching within the application 157 is enabled or disabled.

The user interface 803 can include, for each application 157, a ranking element 812 that increases or decreases the rank of a particular application 157 with respect to other applications 157 in a listing of applications 157. The user interface 803 can show the applications 157 according to their current ranking. For example, "App1" can be ranked above "App 5," which can be ranked above "App 4," which can be ranked above "Flows," or workflows defined in the workflow application 159. Search results corresponding to "App1" can be ranked above those for "App 5," which can be ranked above those for "App 4," which can be ranked above those for "Flows."

Figure 9:
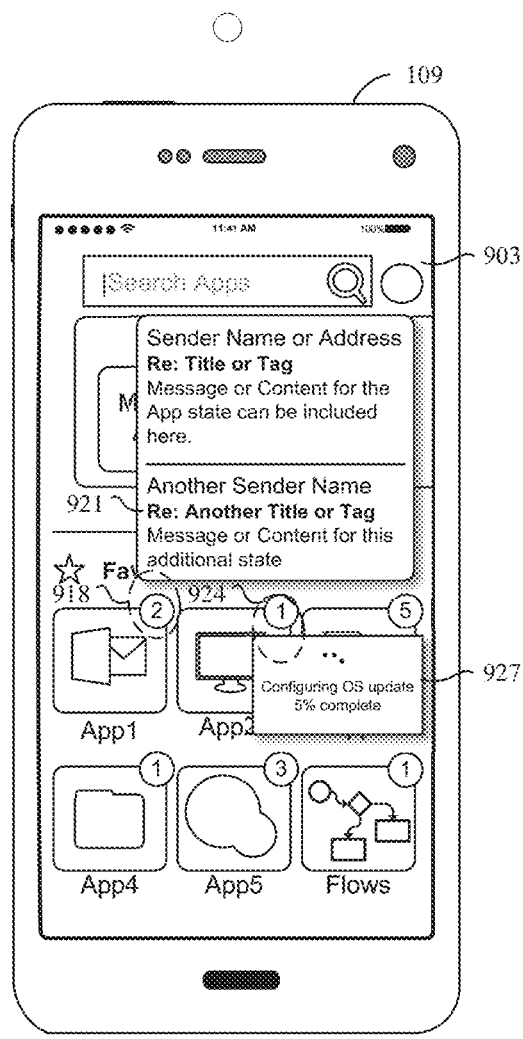
FIG. 9 is another drawing illustrating functionalities implemented by components of the networked environment and presented using a display of a client device.

FIG. 9 shows an example of a user interface 903 generated by the workflow application 159 and rendered for display on a client device 109 of FIG. 1. The user interface 903 illustrates examples of providing application stating for an application 157 on the client device 109 without opening the application 157. The user interface 903 can also be generated by the workflow web application 136 of the workflow service 120. The user interface 903 is similar to the user interface 503 of FIG. 5, except that the user interface 903 is configured for the workflow application 159 when executed or accessed using a mobile device, tablet device, or another touch screen device.

The workflow application 159 can detect a user interaction 918 with the state notification badge for "App1." The user interaction 918 can include a touch, long press for a period of time, or a gesture relative to the state notification badge or the application icon. The workflow application 159 can generate an application content element 921 that provides application content 179 corresponding to new application states for the application 157 corresponding to "App1." The workflow application 159 can detect user gestures relative to the application content element 921 to allow a user to scroll through multiple states or additional application content 179. Certain user interactions, such as a long press, swipe left or right, or other gesture relative to a particular application state within the application content element 521 can cause the application 157 corresponding to "App1" to be opened on the client device 109 to show the selected application state.

The workflow application 159 can detect a user interaction 924 with the state notification badge for "App2," which can be a virtualization or virtual desktop application. In response to the user interaction, the workflow application 159 can generate an application content element 927 that provides application content 179 corresponding to the virtual desktop application. For example, the workflow application 159 can provide an image or video of the virtual desktop.

Figure 10:
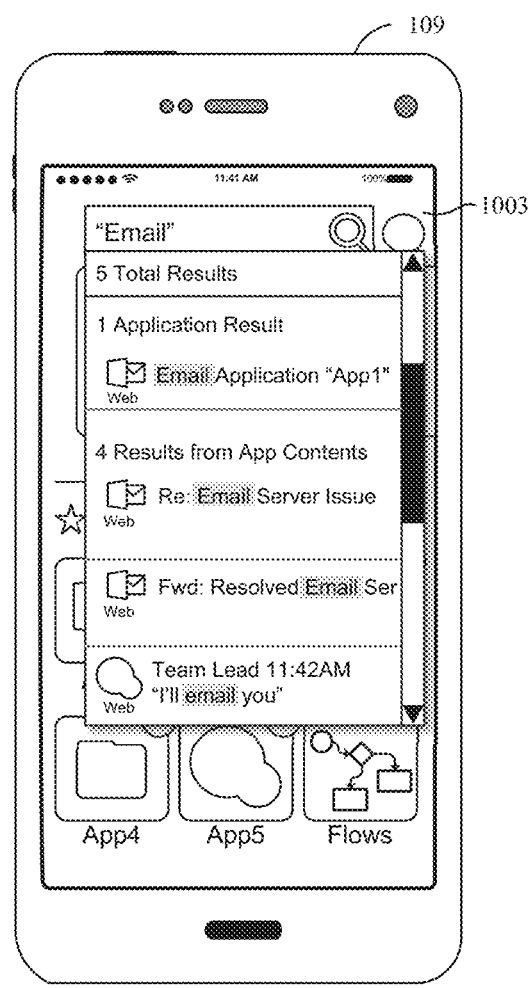
FIG. 10 is another drawing illustrating functionalities implemented by components of the networked environment and presented using a display of a client device.

FIG. 10 shows an example of a user interface 1003 generated by the workflow application 159 and rendered for display on a client device 109 of FIG. 1. The user interface 1003 illustrates examples of providing application searching for an application 157 on the client device 109 without opening the application 157. The user interface 1003 can also be generated by the workflow web application 136 of the workflow service 120. The user interface 1003 is similar to the user interface 603 of FIG. 6, except that the user interface 1003 is configured for the workflow application 159 when executed or accessed using a mobile device, tablet device, or another touch screen device.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by an application 157, workflow service 120, or another application can be rendered. In some examples, the user interface can be generated with user interface data provided by the computing environment 103. The client devices 109 can also include one or more input/output devices that can include, for example, a capacitive touchscreen or other type of touch input device, fingerprint reader, or keyboard.

Although the workflow service 120, client applications 157, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system. The computer-readable medium can include any one of many physical media, such as magnetic, optical, or semi-conductor media. Examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

Embodiments of the present disclosure can be described with reference to the following clauses. It is understood that the aspects described in a clause can be combined with aspects described in any one of the other clauses and any combination of the other clauses.

Clause 1 describes a system, comprising: at least one computing device comprising at least one processor and at least one memory; and machine-readable instructions stored in the at least one memory, wherein the instructions, when executed by the at least one processor, cause the at least one computing device to at least: identify an application state definition for an application accessible through a workflow application on a client device; transmit, from the workflow application to a workflow service, a state synchronization request for the application state definition; receive, from the workflow service, an application state corresponding to the application state definition; and generate at least one notification element that provides an indication of the application state in the workflow application without opening the application on the client device.

Clause 2 describes the system of clause 1, wherein the instructions, when executed by the at least one processor, cause the at least one computing device to at least: determine that the application state is a new application state, wherein the at least one notification element is generated based on the application state being the new application state.

Clause 3 describes the system of clause 1, wherein a user interface of the workflow application comprises an application icon for the application, and the at least one notification element comprises a notification badge displayed in relation to the application icon.

Clause 4 describes the system of clause 3, wherein the instructions, when executed by the at least one processor, cause the at least one computing device to at least: provide, by the workflow application, a preview element that includes application content associated with the application state without opening the application on the client device.

Clause 5 describes the system of clause 1, wherein the at least one notification element comprises a pop-up message within the workflow application.

Clause 6 describes the system of clause 1, wherein the instructions, when executed by the at least one processor, cause the at least one computing device to at least: toggle a synchronization status in response to a user selection of a user interface element of the workflow application, wherein the synchronization status is associated with synchronization for at least one of: the application, and the application state definition.

Clause 7 describes the system of clause 1, wherein the instructions, when executed by the at least one processor, cause the at least one computing device to at least: identify, by the workflow application, a user-specification of the application state definition through a state-definition user interface of the workflow application.

Clause 8 describes a non-transitory computer-readable medium comprising machine-readable instructions, wherein the instructions, when executed by at least one processor, cause at least one computing device to at least: identify an application state definition for an application accessible through a workflow application on a client device; transmit, from the workflow application to a workflow service, a state synchronization request for the application state definition; receive, from the workflow service, an application state corresponding to the application state definition; and generate at least one notification element that provides an indication of the application state in the workflow application without opening the application on the client device.

Clause 9 describes the non-transitory computer-readable medium of clause 8, wherein the instructions, when executed by the at least one processor, cause the at least one computing device to at least: determine that the application state is a new application state, wherein the at least one notification element is generated based on the application state being the new application state.

Clause 10 describes the non-transitory computer-readable medium of clause 8, wherein a user interface of the workflow application comprises an application icon for the application, and the at least one notification element comprises a notification badge displayed in relation to the application icon.

Clause 11 describes the non-transitory computer-readable medium of clause 10, wherein the instructions, when executed by the at least one processor, cause the at least one computing device to at least: provide, by the workflow application, a preview element that includes application content associated with the application state without opening the application on the client device.

Clause 12 describes the non-transitory computer-readable medium of clause 8, wherein the at least one notification element comprises a pop-up message within the workflow application.

Clause 13 describes the non-transitory computer-readable medium of clause 8, wherein the instructions, when executed by the at least one processor, cause the at least one computing device to at least: toggle a synchronization status in response to a user selection of a user interface element of the workflow application, wherein the synchronization status is associated with synchronization for at least one of: the application, and the application state definition.

Clause 14 describes the non-transitory computer-readable medium of clause 8, wherein the workflow service automatically authenticates with a network service, retrieves the application state from the network service, and provides the application state to the workflow application.

Clause 15 describes a method comprising: identifying an application state definition for an application accessible through a workflow application on a client device; transmitting, from the workflow application to a workflow service, a state synchronization request for the application state definition; receiving, from the workflow service, an application state corresponding to the application state definition; and generating at least one notification element that provides an indication of the application state in the workflow application without opening the application on the client device.

Clause 16 describes the method of clause 15, further comprising: determining that the application state is a new application state, wherein the at least one notification element is generated based on the application state being the new application state.

Clause 17 describes the method of clause 15, wherein a user interface of the workflow application comprises an application icon for the application, and the at least one notification element comprises a notification badge displayed in relation to the application icon.

Clause 18 describes the method of clause 17, further comprising: providing, by the workflow application, a preview element that includes application content associated with the application state without opening the application on the client device.

Clause 19 describes the method of clause 15, wherein the at least one notification element comprises a pop-up message within the workflow application.

Clause 20 describes the method of clause 15, further comprising: toggling a synchronization status in response to a user selection of a user interface element of the workflow application, wherein the synchronization status is associated with synchronization for at least one of: the application, and the application state definition.

Clause 21 describes a system, comprising: at least one computing device comprising at least one processor and at least one memory; and machine-readable instructions stored in the at least one memory, wherein the instructions, when executed by the at least one processor, cause the at least one computing device to at least: identify a search query entered through a search element of a workflow application on a client device; transmit, from the workflow application to a workflow service, a request to search within an application based on the search query: receive, from the workflow service, application content corresponding to the search query and the application; and provide, by the workflow application, at least one search result based on the application content without opening the application on the client device.

Clause 22 describes the system of clause 21, wherein the workflow service automatically authenticates with a network service associated with the application and retrieves the application content from the network service.

Clause 23 describes the system of clause 21, wherein the instructions, when executed by the at least one processor, cause the at least one computing device to at least: open, by the workflow application, the application to show the application content within the application, wherein the application is opened in response to a user-selection of the at least one search result.

Clause 24 describes the system of clause 21, wherein the instructions, when executed by the at least one processor, cause the at least one computing device to at least: authenticate the workflow application with the workflow service using a single-sign-on token.

Clause 25 describes the system of clause 21, wherein the instructions, when executed by the at least one processor, cause the at least one computing device to at least: toggle a search status for the application in response to a user-manipulation of a user interface element of the workflow application, wherein the search status enables or disables the search element of the workflow application to search within the application without opening the application on the client device.

Clause 26 describes the system of clause 21, wherein the instructions, when executed by the at least one processor, cause the at least one computing device to at least: arrange a search priority list in response to a user-manipulation of a user interface element of the workflow application, wherein the search priority list causes search results for a plurality of applications to be listed according to the search priority list.

Clause 27 describes the system of clause 26, wherein the search priority list indicates a priority for a respective one of the plurality of applications accessible through the workflow application.

Clause 28 describes a non-transitory computer-readable medium comprising machine-readable instructions, wherein the instructions, when executed by at least one processor, cause at least one computing device to at least: identify a search query entered through a search element of a workflow application on a client device; transmit, from the workflow application to a workflow service, a request to search within an application based on the search query; receive, from the workflow service, application content corresponding to the search query and the application; and provide, by the workflow application, at least one search result based on the application content without opening the application on the client device.

Clause 29 describes the non-transitory computer-readable medium of claim 28, wherein the workflow service automatically authenticates with a network service associated with the application and retrieves the application content from the network service.

Clause 30 describes the non-transitory computer-readable medium of claim 28, wherein the instructions, when executed by the at least one processor, cause the at least one computing device to at least: open, by the workflow application, the application to show the application content within the application, wherein the application is opened in response to a user-selection of the at least one search result.

Clause 31 describes the non-transitory computer-readable medium of claim 28, wherein the instructions, when executed by the at least one processor, cause the at least one computing device to at least: authenticate the workflow application with the workflow service using a single-sign-on token.

Clause 32 describes the non-transitory computer-readable medium of claim 28, wherein the instructions, when executed by the at least one processor, cause the at least one computing device to at least: toggle a search status for the application in response to a user-manipulation of a user interface element of the workflow application, wherein the search status enables or disables the search element of the workflow application to search within the application without opening the application on the client device.

Clause 33 describes the non-transitory computer-readable medium of claim 28, wherein the instructions, when executed by the at least one processor, cause the at least one computing device to at least: arrange a search priority list in response to a user-manipulation of a user interface element of the workflow application, wherein the search priority list causes search results for a plurality of applications to be listed according to the search priority list.

Clause 34 describe the non-transitory computer-readable medium of clause 33, wherein the search priority list indicates a priority for a respective one of the plurality of applications accessible through the workflow application.

Clause 35 describes a method comprising: identifying a search query entered through a search element of a workflow application on a client device; transmitting, from the workflow application to a workflow service, a request to search within an application based on the search query; receiving, from the workflow service, application content corresponding to the search query and the application; and providing, by the workflow application, at least one search result based on the application content without opening the application on the client device.

Clause 36 describes the method of clause 35, wherein the workflow service automatically authenticates with a network service associated with the application and retrieves the application content from the network service.

Clause 37 describes the method of clause 35, further comprising: opening, by the workflow application, the application to show the application content within the application, wherein the application is opened in response to a user-selection of the at least one search result.

Clause 38 describes the method of clause 35, further comprising: authenticating the workflow application with the workflow service using a single-sign-on token.

Clause 39 describes the method of clause 35, further comprising: toggling a search status for the application in response to a user-manipulation of a user interface element of the workflow application, wherein the search status enables or disables the search element of the workflow application to search within the application without opening the application on the client device.

Clause 40 describes the method of clause 35, further comprising: arranging a search priority list in response to a user-manipulation of a user interface element of the workflow application, wherein the search priority list causes search results for a plurality of applications to be listed according to the search priority list.

Clause 41 describes a system, comprising: at least one computing device comprising at least one processor and at least one memory; and machine-readable instructions stored in the at least one memory, wherein the instructions, when executed by the at least one processor, cause the at least one computing device to at least: generate, by a workflow application, a workflow creation user interface to create a networking workflow comprising at least one networking action; identify, through the workflow creation user interface, a user-specification of a networking action for a first application to utilize application content from a second application, wherein the first application and the second application are accessible through the workflow application; verify the networking action based on a response to a test action request transmitted to the workflow service, and transmit the networking action from the workflow application to a workflow service, wherein the workflow service retrieves the application content from the second application and causes the first application to utilize the application content from the second application according to the networking action.

Clause 42 describes the system of clause 41, wherein the instructions, when executed by the at least one processor, cause the at least one computing device to at least: identify, through the workflow creation user interface, a user-specification of a workflow trigger for the networking workflow.

Clause 43 describes the system of clause 42, wherein the workflow trigger comprises a user-activated trigger, and the networking action is transmitted in response to an identification of the user-activated trigger through a user interface of the workflow application.

Clause 44 describes the system of clause 42, wherein the workflow trigger comprises a time-based trigger, and the networking action is transmitted in response to an identification, by the workflow application, of the time-based trigger.

Clause 45 describes the system of clause 42, wherein the workflow trigger comprises a state-based trigger, and the networking action is transmitted in response to receiving, from the workflow service, an indication of an application state corresponding to the state-based trigger.

Clause 46 describes the system of clause 41, wherein the indication that the networking action is successful comprises an indication that an Application Programming Interface (API) call for the networking action is working, or an indication that an output of the test of the networking action is an expected output.

Clause 47 describes the system of clause 41, wherein a networking workflow definition comprising the networking action is transmitted to the workflow service to enable the workflow service to automatically perform the networking workflow definition in response to the workflow trigger.

Clause 48 describes a non-transitory computer-readable medium comprising machine-readable instructions, wherein the instructions, when executed by at least one processor, cause at least one computing device to at least: generate, by a workflow application, a workflow creation user interface to create a networking workflow comprising at least one networking action; identify, through the workflow creation user interface, a user-specification of a networking action for a first application to utilize application content from a second application, wherein the first application and the second application are accessible through the workflow application; verify the networking action based on a response to a test action request transmitted to the workflow service; and transmit the networking action from the workflow application to a workflow service, wherein the workflow service retrieves the application content from the second application and causes the first application to utilize the application content from the second application according to the networking action.

Clause 49 describes the non-transitory computer-readable medium of clause 48, wherein the instructions, when executed by the at least one processor, cause the at least one computing device to at least: identify, through the workflow creation user interface, a user-specification of a workflow trigger for the networking workflow.

Clause 50 describes the non-transitory computer-readable medium of clause 49, wherein the workflow trigger comprises a user-activated trigger, and the networking action is transmitted in response to an identification of the user-activated trigger through a user interface of the workflow application.

Clause 51 describes the non-transitory computer-readable medium of clause 49, wherein the workflow trigger comprises a time-based trigger, and the networking action is transmitted in response to an identification, by the workflow application, of the time-based trigger.

Clause 52 describes the non-transitory computer-readable medium of clause 49, wherein the workflow trigger comprises a state-based trigger, and the networking action is transmitted in response to receiving, from the workflow service, an indication of an application state corresponding to the state-based trigger.

Clause 53 describes the non-transitory computer-readable medium of clause 48, wherein the indication that the networking action is successful comprises an indication that an Application Programming Interface (API) call for the networking action is working, or an indication that an output of the test of the networking action is an expected output.

Clause 54 describes the non-transitory computer-readable medium of clause 48, wherein a networking workflow definition comprising the networking action is transmitted to the workflow service to enable the workflow service to automatically perform the networking workflow definition in response to the workflow trigger.

Clause 55 describes a method comprising: generating, by a workflow application, a workflow creation user interface to create a networking workflow comprising at least one networking action; identifying, through the workflow creation user interface, a user-specification of a networking action for a first application to utilize application content from a second application, wherein the first application and the second application are accessible through the workflow application; verifying the networking action based on a response to a test action request transmitted to the workflow service; and transmitting the networking action from the workflow application to a workflow service, wherein the workflow service retrieves the application content from the second application and causes the first application to utilize the application content from the second application according to the networking action.

Clause 56 describes the method of clause 55, further comprising: identifying, through the workflow creation user interface, a user-specification of a workflow trigger for the networking workflow.

Clause 57 describes the method of clause 56, wherein the workflow trigger comprises a user-activated trigger, and the networking action is transmitted in response to an identification of the user-activated trigger through a user interface of the workflow application.

Clause 58 describes the method of clause 56, wherein the workflow trigger comprises a time-based trigger, and the networking action is transmitted in response to an identification, by the workflow application, of the time-based trigger.

Clause 59 describes the method of clause 56, wherein the workflow trigger comprises a state-based trigger, and the networking action is transmitted in response to receiving, from the workflow service, an indication of an application state corresponding to the state-based trigger.

Clause 60 describes the method of clause 55, wherein the indication that the networking action is successful comprises an indication that an Application Programming Interface (API) call for the networking action is working, or an indication that an output of the test of the networking action is an expected output.

It is emphasized that the above-described embodiments of the present disclosure are merely possible examples of implementations described for a clear understanding of the principles of the disclosure. While the above-described embodiments of the present disclosure are described with respect to various figures, it is understood that the concepts described with respect to a particular figure can also be utilized along with and in combination with the concepts described in the additional figures. Many variations and modifications can be made to the above-described embodiments without departing substantially from the spirit and principles of the disclosure. All such modifications and variations are intended to be included within the scope of this disclosure.

Therefore, the following is claimed:

1. A system, comprising:
   at least one computing device comprising at least one processor and at least one memory; and machine-readable instructions stored in the at least one memory, wherein the instructions, when executed by the at least one processor, cause the at least one computing device to at least:
- identify an application state definition for an application accessible through a workflow application on a client device;
- transmit, from the workflow application to a workflow service, a state synchronization request for the application state definition;
- receive, from the workflow service, an application state corresponding to the application state definition; and
- generate at least one notification element that provides an indication of the application state in the workflow application without opening the application on the client device.

2. The system of claim 1, wherein the instructions, when executed by the at least one processor, cause the at least one computing device to at least:
- determine that the application state is a new application state, wherein the at least one notification element is generated based on the application state being the new application state.

3. The system of claim 1, wherein a user interface of the workflow application comprises an application icon for the application, and the at least one notification element comprises a notification badge displayed in relation to the application icon.

4. The system of claim 3, wherein the instructions, when executed by the at least one processor, cause the at least one computing device to at least:
- provide, by the workflow application, a preview element that includes application content associated with the application state without opening the application on the client device.

5. The system of claim 1, wherein the at least one notification element comprises a pop-up message within the workflow application.

6. The system of claim 1, wherein the instructions, when executed by the at least one processor, cause the at least one computing device to at least:
- toggle a synchronization status in response to a user selection of a user interface element of the workflow application, wherein the synchronization status is associated with synchronization for at least one of: the application, and the application state definition.

7. The system of claim 1, wherein the instructions, when executed by the at least one processor, cause the at least one computing device to at least:
- identify, by the workflow application, a user-specification of the application state definition through a state-definition user interface of the workflow application.

8. A non-transitory computer-readable medium comprising machine-readable instructions, wherein the instructions, when executed by at least one processor, cause at least one computing device to at least:
- identify an application state definition for an application accessible through a workflow application on a client device;
- transmit, from the workflow application to a workflow service, a state synchronization request for the application state definition;
- receive, from the workflow service, an application state corresponding to the application state definition; and
- generate at least one notification element that provides an indication of the application state in the workflow application without opening the application on the client device.

9. The non-transitory computer-readable medium of claim 8, wherein the instructions, when executed by the at least one processor, cause the at least one computing device to at least:
- determine that the application state is a new application state, wherein the at least one notification element is generated based on the application state being the new application state.

10. The non-transitory computer-readable medium of claim 8, wherein a user interface of the workflow application comprises an application icon for the application, and the at least one notification element comprises a notification badge displayed in relation to the application icon.

11. The non-transitory computer-readable medium of claim 10, wherein the instructions, when executed by the at least one processor, cause the at least one computing device to at least:
- provide, by the workflow application, a preview element that includes application content associated with the application state without opening the application on the client device.

12. The non-transitory computer-readable medium of claim 8, wherein the at least one notification element comprises a pop-up message within the workflow application.

13. The non-transitory computer-readable medium of claim 8, wherein the instructions, when executed by the at least one processor, cause the at least one computing device to at least:
- toggle a synchronization status in response to a user selection of a user interface element of the workflow application, wherein the synchronization status is associated with synchronization for at least one of: the application, and the application state definition.

14. The non-transitory computer-readable medium of claim 8, wherein the workflow service automatically authenticates with a network service, retrieves the application state from the network service, and provides the application state to the workflow application.

15. A method comprising:
- identifying an application state definition for an application accessible through a workflow application on a client device;
- transmitting, from the workflow application to a workflow service, a state synchronization request for the application state definition;
- receiving, from the workflow service, an application state corresponding to the application state definition; and
- generating at least one notification element that provides an indication of the application state in the workflow application without opening the application on the client device.

16. The method of claim 15, further comprising:
- determining that the application state is a new application state, wherein the at least one notification element is generated based on the application state being the new application state.

17. The method of claim 15, wherein a user interface of the workflow application comprises an application icon for the application, and the at least one notification element comprises a notification badge displayed in relation to the application icon.

18. The method of claim 17, further comprising:
providing, by the workflow application, a preview element that includes application content associated with the application state without opening the application on the client device.

19. The method of claim 15, wherein the at least one notification element comprises a pop-up message within the workflow application.

20. The method of claim 15, further comprising:
toggling a synchronization status in response to a user selection of a user interface element of the workflow application, wherein the synchronization status is associated with synchronization for at least one of the application, and the application state definition.

* * * * *